Oct. 16, 1962   A. A. HIRST ETAL   3,058,488
ROTARY VALVES
Filed Jan. 28, 1959   2 Sheets-Sheet 1

United States Patent Office 3,058,488
Patented Oct. 16, 1962

3,058,488
ROTARY VALVES
Arthur Algernon Hirst, Ashby-de-la-Zouch, and Alan Norman Burns, Branston, Burton-on-Trent, England, assignors to Coal Industry (Patents) Limited, London, England, a company of Great Britain
Filed Jan. 28, 1959, Ser. No. 789,622
Claims priority, application Great Britain Feb. 25, 1958
5 Claims. (Cl. 137—596)

This invention relates to rotary valves and more particularly, although not exclusively, to rotary valves for use with washer boxes for coal and the like in which the pulsations of the water and the materials to be washed in passing over perforated sieve plates are caused by the pressure of air acting on the water.

In such washer boxes it is an advantage to be able to control or vary the cycle of water pulsations by adjusting the cycle of air admission and exhaust. Various ways of achieving this are described in a paper by Hirst and Wallace entitled, "Air Cycles for Baum Jigs," presented to the Second International Coal Preparation Congress held at Essen, Germany, in September 1954. The methods described in that paper involve the use of washery air valves which permit variations to be made in the effective port openings for air admission and air exhaust. These methods are not always mechanically convenient and, when adjustable sliding members are used, it is difficult to guard against air leakage and the sliding member may be subject to undue wear and tear. Moreover, adjustable sliding members for varying the effective openings of valve ports in the stator and/or rotor tend to move out of adjustment when the valve is working, thereby deranging the air cycle.

An object of the present invention is to provide an air valve which permits the air cycle to be adjusted whilst a washer box is working without the disadvantageous feature of a sliding member.

The present invention provides a rotary fluid valve in which the rotor is provided with a port in communication with an inlet/outlet port of the valve, the stator is provided with an inlet port, an outlet port, and a third port constituting either a second inlet port or a second outlet port, and there is provided a throttling device by which during operation of the valve flow of fluid through the third port can be variably throttled independently of flow of fluid through the inlet and outlet ports of the stator, the arrangement being such that upon rotation of the rotor the first port thereof communicates successively with the inlet port, the third port and the exhaust port of the stator.

By way of example, one embodiment of the present invention will now be described with reference to the accompanying drawings in which.

Figure 2:
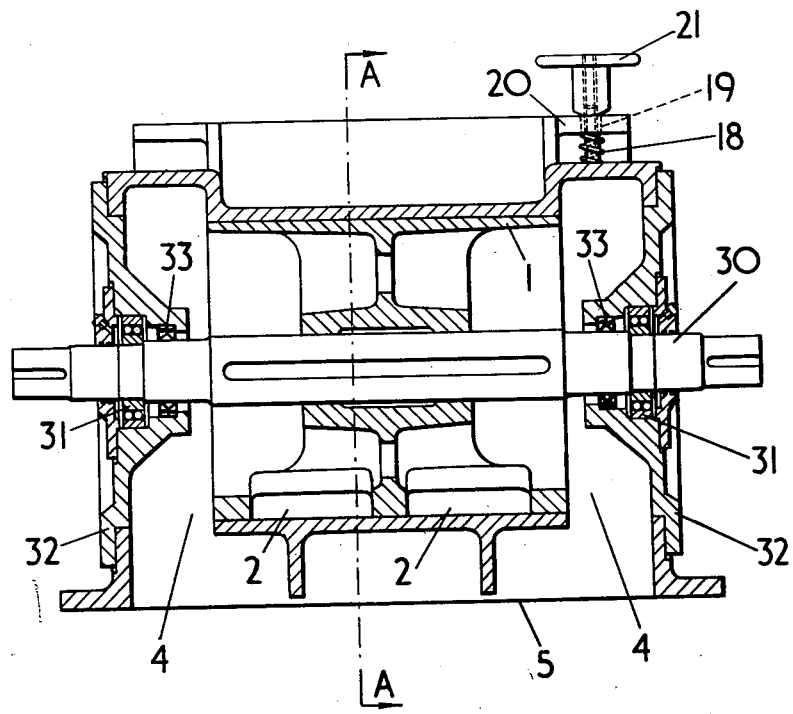
FIGURE 2 is an axial section.

Referring to the drawings, a cylindrical rotor 1 open at both ends has a port 2 in its side wall. The stator or valve housing 3 has a passage 4 connected to the air chamber of the washer box (not shown) through an inlet/outlet port 5 in the base of the valve. As shown in FIGURE 2 the passage 4 connects the port 5 to the open ends of the valve rotor. It is to be understood that the rotor 1 of the valve could be open at one end only. The valve stator or housing 3 is provided with an inlet 6 connected to a supply of compressed air (not shown) and an exhaust 7 which communicates with the atmosphere. Preferably a regulator 8 is provided to control the exhaust of air to atmosphere. In the form of the invention shown in the drawings the regulator 8 is in the form of a slide and is so arranged that the exhaust cannot be entirely shut off. The length of the regulating slide 8 is such that in its open position the exhaust passage 7 is completely open to atmosphere but at the opposite end of its adjustment a gap 9 is left for the exhaust of air. This arrangement makes it impossible for a washer box operator entirely to prevent air exhaust which condition would make efficient washing impossible. A clamping screw 8A is provided to lock the regulating slide 8 in any required position.

Figure 3:
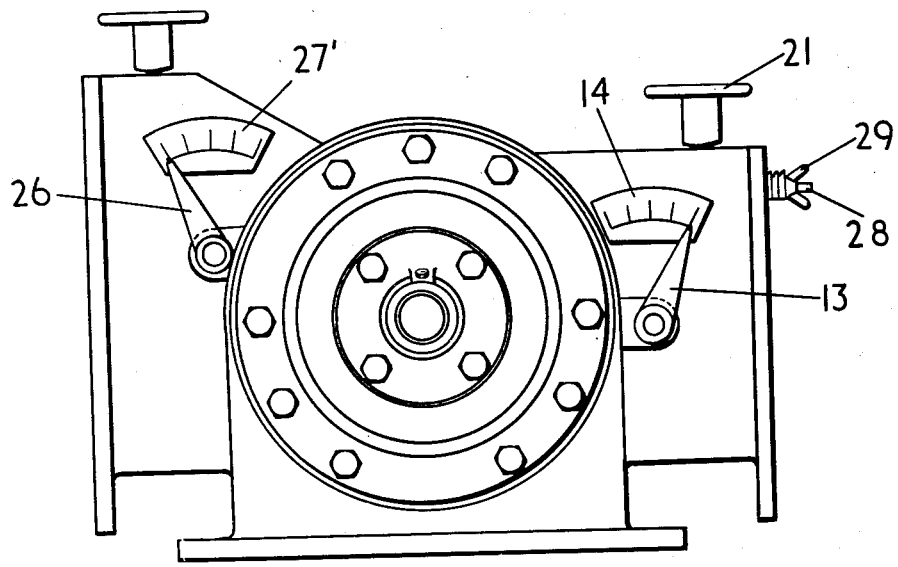
FIGURE 3 is an end view of the valve.

The inlet connection 6 communicates with an inlet stator port 10 and with a second inlet stator port 11. The flow of air between the inlet 6 and the stator port 11 can be regulated by an adjustable throttle valve 12 which can be fully open, fully closed or set to any intermediate position. The position of the throttle valve 12 is indicated by a pointer 13 (FIGURE 3) attached to the spindle of the throttle valve 12, the position of the valve being shown on a graduated scale 14. The spindle of the throttle valve also carries a radial arm 15 hinged to a shackle 16. The shackle 16 is attached to a screwed rod 17 surrounded by a compression spring 18. The rod 17 passes through a clearance hole 19 in a frame member 20. A hand wheel 21 has a screwed hole engaging with the threads of the rod 17. Rotation of the hand wheel 21 in co-operation with the action of the spring 18 enables the throttle valve 12 to be located in any desired position. Alternatively, instead of, or in addition to, the use of a spring, a lock nut, not shown, may be screwed on to the rod 17 between the shackle 16 and the frame member 20. It is to be understood that any other known means may be used for adjusting and indicating the position of the throttle valve 12.

The exhaust passage 7 communicates with an exhaust port 22 and a second exhaust port 23. The flow of air from the exhaust port 23 to the exhaust passage 7 can be regulated by an adjustable throttle valve 24. The throttle valve 24 is adjusted and its position indicated by any known means. The drawings illustrate means of adjusting the throttle valve 24 which are similar to those described in relation to the throttle valve 12. The position of the throttle valve 24 is adjusted by rotating the hand wheel 25 and its position is indicated by a pointer 26 moving over a graduated scale 27'.

In a preferred arrangement provision is made for adjusting the length of the arc subtended by the exhaust port 22 at the end of the port remote from the further exhaust port 23. This is conveniently done by using one or more compression plates 26a held in position by a plurality of bolts 27. The plates 26a are preferably relatively thin to permit fairly fine adjustment of the arc subtended by port 22. It is convenient in practice to make provision, on the air valve, for storing any compression plates not being used for restricting the opening of the port 22. Referring to the drawings, unused compression plates 28a are stored by attaching them to the frame of the air valve by screwed studs 28 and wing nuts 29. This arrangement has an added advantage in that the number of compression plates in use is immediately known by subtracting the number of compression plates attached to the frame of the valve at 28 from the total number of plates provided with each valve.

The rotor 1 is keyed or otherwise secured to shaft 30 rotatably mounted in bearings 31 in the end plates 32 of the valve. Seals 33 prevent the passage of air through the bearings 31. There is a relatively fine clearance between the valve rotor 1 and the stator 3 so that air can pass between the rotor and stator only when the rotor port 2 is open to one or more of the stator ports 10, 11, 22 and 23.

Figure 1:
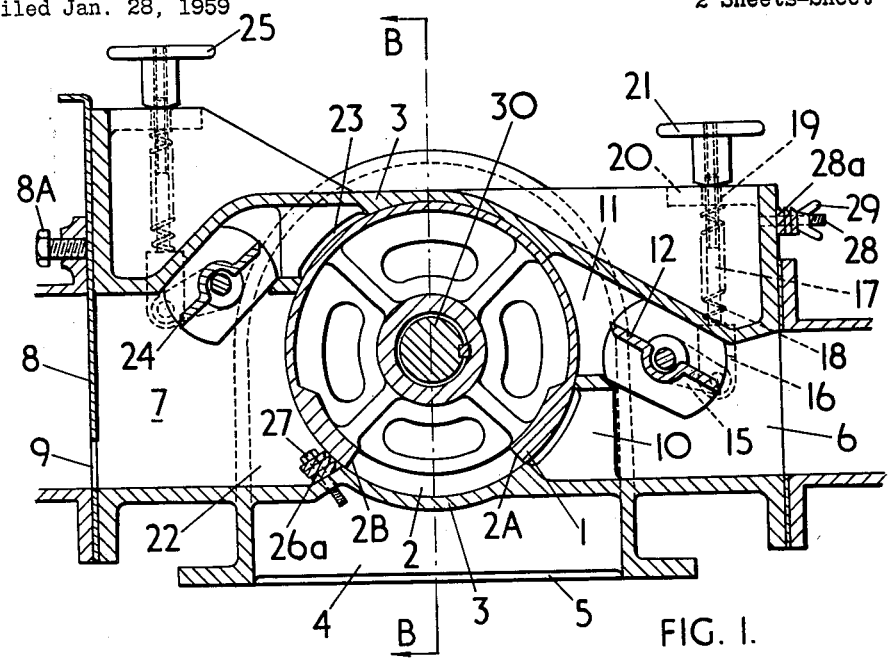
FIGURE 1 is a section of the valve perpendicular to its axis.

Referring to FIGURE 1, the rotor 2 is arranged to revolve in an anti-clockwise direction within the stator 3.

In the position of the valve shown in FIG. 1, the inside of the rotor 1 and the washer box air chamber (not shown) with which the rotor communicates via passages 4 and 5 is closed both to the inlet 6 and the exhaust 7. When the rotor is driven in an anti-clockwise direction the leading edge 2A of the port 2 will open to the startor port 10. As rotation continues, the opening available for air to pass from the inlet 6 through ports 10 and 2 will increase until the trailing edge 2B of the port 2 commences to cover the port 10. The rotor port 2 will similarly open and close in relation to the further inlet port 11 and, as rotation continues, will open and close in relation to the exhaust ports 23 and 22. After the rotor port 2 closes to the stator inlet port 11 there is a phase when the port 2 is closed both to inlet and to exhaust.

In order that the port is sealed, both to inlet and to exhaust, before air admission commences, the arc subtended by the blind area of the stator at the bottom thereof, as seen in FIG. 1, must be at least equal to the arc subtended by the rotor port 2. Preferably, to allow for wear and tear and/or inaccuracies of manufacture, the arc subtended by the blind area of the stator should be slightly greater than that for the rotor port 2. It will be appreciated that, if the arc subtended by the blind area of the stator is less than that for the rotor port 2, there will be a phase when the valve inlet 6 is in direct communication with the exhaust 7 through the rotor port 2. Any air so passing directly from inlet to exhaust will not be used to produce water pulsations and power will be wasted. For the same reason the arc subtended by the blind area of the stator at the upper part thereof as seen in FIGURE 1 should also be at least equal to or preferably slightly greater than the arc subtended by the rotor port 2.

Let the arc subtended by:

Rotor port 2=A degrees
    Stator port 10=B degrees
    Stator port 11=C degrees
    Stator port 23=D degrees and Stator port 22=E degrees Also, let the blind stator areas at the lower and upper parts be equal and be H degrees where H is greater than A. Assume that no pressure plates are used and that the throttle valves 12 and 24 are open.

Then:

Admission=A+B+C degrees
    Expansion=H−A degrees
    Exhaust=A+D+E degrees
    Compression=H−A degrees and B+C+D+E+2H=360 degrees In a preferred arrangement:

A=75 degrees
    B=35 degrees
    C=53 degrees
    D=41 degrees
    E=75 degrees
    H=78 degrees When both throttle valves 12 and 24 are open:

Admission=A+B+C=163 degrees
    Expansion=H−A=3 degrees
    Exhaust=A+D+E=191 degrees
    Compression=H−A=3 degrees When both the throttle valves 12 and 24 are closed:

Admission=A+B=110 degrees
    Expansion=(H−A)+C+D=97 degrees
    Exhaust=A+E=150 degrees
    Compression=H−A=3 degrees It will be seen that the above described embodiment provides convenient means of controlling the air cycle with particular relation to the phases of air admission and air exhaust. Referring first to the admission phase, when the throttle valve 12 is closed the air admission phase is 110 degrees whereas when the throttle valve 12 is open the admission period is 163 degrees. When the throttle valve is adjusted to positions intermediate the fully closed and the fully open position, the effect on the water pulsation is somewhat similar to the effect of varying the admission period over the range 110 to 163 degrees, but the mechanical means of achieving the variation is simpler than the known methods of varying the arc subtended by ports in the rotor or stator. Similarly, the effect on the water pulsations of adjusting the position of the throttle valve 24 is somewhat similar to that resulting from a variation of the arcs subtended by the valve ports to produce an exhaust phase varying from 150 to 191 degrees Adjustment of the throttle valve 12 affects the expansion as well as the admission phase, the effect of closing the throttle being to increase the significance of the expansion phase. Similarly, closure of the throttle valve 24 has the effect of prolonging the expansion at the expense of the exhaust phase.

In FIGURE 1, six compression plates are provided, each covering 2½ degrees of arc, three only of these compression plates being used to blank the lower part of port 22. This has the effect of increasing the compression phase by 7½ degrees and of similarly reducing the exhaust phase by 7½ degrees. By providing six such compression plates the compression phase can be varied in 2½ degree steps from a minimum of 3 degrees to a maximum of 3+(6×2½)=18 degrees, with a consequent contrariwise variation in the exhaust phase.

It is to be understood, of course, that the invention is not limited to washer box air valves in which the arcs subtended by the valve ports are as hereinbefore described. The supply of compressed air to the valve inlet 6 may be controlled by any suitable valve or throttle of known design. In the form of the invention described by the drawings the valve controlling the supply of compressed air to the inlet 6 would be that of a separate unit connected between the inlet 6 and the compressed air supply. In an alternative form of the invention, which is not illustrated, the supply of compressed air to the washer box air valve could be controlled by a valve or throttle which is an integral part of the washer box air valve and arranged to control the flow of compressed air through the inlet 6.

As a still further alternative, the inlet ports 10 and 11, instead of communicating with a single inlet connection 6 may be separately connected to separate inlets for the supply of compressed air. In this alternative arrangement, the supply of compressed air to ports 10 and 11 would be separately controlled by valves connected to, or integrally arranged with, the separate inlet connections for the two ports.

Again, the throttle or valve controlling the exhaust of air through the exhaust port 23 may be connected directly to atmosphere instead of being connected to the exhaust connection 7.

It is to be understood that the invention is applicable to washer box air valves with more than two inlet ports or more than two exhaust ports. By way of example, and as a still further alternative, instead of using compression plates 26a to control the compression phase, the stator or frame of the washer box air valve may include a separate exhaust port at the end of the port 22 at which, in the drawings, the compression plates 26a may be attached. Such separate exhaust port could conveniently subtend, say, 15 degrees of arc and would have a separate throttle or valve for controlling the air exhaust through the port. The air exhausting from such throttle or valve would pass either to the exhaust connection 7 or directly to atmosphere.

We claim:

1. In a washer box in which pulsating water currents are produced by compressed air, a rotary air valve for the alternate admission and exhaust of air comprising an open-ended cylindrical rotor continuously rotatable within a stator, said rotor having in its curved surface an inlet-outlet port in communication, through the open end of said rotor, with an inlet-outlet passage provided in the valve, said passage being connected to an air chamber of the washer box; said stator being provided with at least a first and a second inlet port connected to a supply of compressed air and an exhaust port connected to atmosphere, the inlet ports and the exhaust port being located in the stator so as to communicate in turn, upon rotation of the rotor, with said inlet-outlet port; the stator being further provided with a first land located between the second inlet port and the exhaust port, a second land located between the exhaust port and the first inlet port and a third land located between the inlet ports, each of said first and second lands subtending an angle at least equal to that subtended by the inlet-outlet port of the rotor, and said third land subtending an angle not greater than one quarter of the angle subtended by said inlet-outlet port; and means for variably controlling the supply of compressed air to the second inlet port independently of the control of the supply of air to the first inlet port.

2. In a washer box in which pulsating water currents are produced by compressed air, a rotary air valve for the alternate admission and exhaust of air comprising an open-ended cylindrical rotor continuously rotatable within a stator, said rotor having in its curved surface an inlet-outlet port in communication, through the open end of the rotor, with an inlet-outlet passage provided in the valve, said passage being connected to an air chamber of the washer box; said stator being provided with an inlet port connected to a supply of compressed air and at least a first and a second exhaust port connected to atmosphere, the inlet port and the exhaust ports being located in the stator so as to communicate in turn, upon rotation of the rotor, with said inlet-outlet port; the stator being further provided with a first land located between the inlet port and the first exhaust port, a second land located between the second exhaust port and the inlet port, and a third land located between said first and second exhaust ports, each of said first and second lands subtending an angle at least equal to that subtended by the inlet-outlet port of the rotor, and said third land subtending an angle not greater than one quarter of the angle subtended by said inlet-outlet port; and means for variably controlling the exhaust of air from the first exhaust port independently of the control of exhaust from the second exhaust port.

3. In a washer box in which pulsating water currents are produced by compressed air, a rotary air valve for the alternate admission and exhaust of air comprising an open-ended cylindrical rotor continuously rotatable within a stator, said rotor having in its curved surface an inlet-outlet port in communication, through the open end of the rotor, with an inlet-outlet passage provided in the valve, said passage being connected to an air chamber of the washer box; said stator being provided with a first and a second inlet port connected to a supply of compressed air and a first and a second exhaust port connected to atmosphere, the inlet ports and the exhaust ports being located in the stator so as to communicate in turn, in the order named, upon rotation of the rotor, with said inlet-outlet port; said stator being further provided with a first land located between the second inlet port and the first exhaust port, a second land located between the second exhaust port and the first inlet port, a third land located between said first and second inlet ports and a fourth land located between said first and second exhaust ports, said first and second lands each subtending an angle at least equal to that subtended by the inlet-outlet port of the rotor, and said third and fourth lands each subtending an angle not greater than one quarter of the angle subtended by said inlet-outlet port; first means for variably controlling the supply of compressed air to the second inlet port independently of the control of the supply of air to the first inlet port; and second means for variably controlling the exhaust of air from the first exhaust port independently of the control of exhaust of air from the second exhaust port.

4. In a washer box in which pulsating water currents are produced by compressed air, a rotary air valve for the alternate admission and exhaust of air comprising an open-ended cylindrical rotor continuously rotatable within a stator, said rotor having in its curved surface an inlet-outlet port in communication, through the open end of the rotor, with an inlet-outlet passage provided in the valve, said passage being connected to an air chamber of the washer box; said stator being provided with a first and a second inlet port connected to a supply of compressed air and an exhaust port connected to atmosphere, the inlet ports and the exhaust port being located in the stator so as to communicate in turn, upon rotation of the rotor, with said inlet-outlet port; the stator being further provided with a first land located between the second inlet port and the exhaust port and a second land located between the exhaust port and the first inlet port, each of said lands subtending an angle at least equal to that subtended by the inlet-outlet port, the inlet ports being so angularly spaced around the stator that for a part of the valve cycle both the inlet ports communicate simultaneously with the inlet-outlet port; means for variably controlling the supply of compressed air to the second inlet port independently of the control of the supply of air to the first inlet port; and means for increasing the length of arc subtended by said second land.

5. In a washer box in which pulsating water currents are produced by compressed air, a rotary air valve for the alternate admission and exhaust of air comprising an open-ended cylindrical rotor continuously rotatable within a stator, said rotor having in its curved surface an inlet-outlet port in communication, through the open end of the rotor, with an inlet-outlet passage provided in the valve, said passage being connected to an air chamber of the washer box; said stator being provided with an inlet port connected to a supply of compressed air and a first and second exhaust port connected to atmosphere, the inlet port and the exhaust ports being located in the stator so as to communicate in turn, upon rotation of the rotor, with said inlet-outlet port; the stator being further provided with a first land located between the inlet port and the first exhaust port and a second land located between the second exhaust port and the inlet port, each of said lands subtending an angle at least equal to that subtended by the inlet-outlet port, the exhaust ports being so angularly spaced around the stator that for a part of the valve cycle both the exhaust ports communicate simultaneously with the inlet-outlet port; means for variably controlling the exhaust of air from the first exhaust port independently of the control of exhaust from the second exhaust port; and means for increasing the length of arc subtended by said second land.

References Cited in the file of this patent

UNITED STATES PATENTS

| | | |
|---|---|---|
| 1,132,899 | Baker | Mar. 23, 1915 |
| 1,830,067 | Mellers | Nov. 3, 1931 |
| 1,910,004 | De Ville | May 23, 1933 |
| 2,199,821 | Hapgood | May 21, 1940 |
| 2,215,728 | Ruegg | Sept. 24, 1940 |
| 2,319,347 | Reed | May 18, 1943 |